United States Patent [19]

Koppensteiner

[11] 4,228,972

[45] Oct. 21, 1980

[54] WEB SUPPLY AND TAKE-UP SYSTEM

[75] Inventor: Eugene F. Koppensteiner, Niles, Ill.

[73] Assignee: Bell & Howell Company, Chicago, Ill.

[21] Appl. No.: 36,193

[22] Filed: May 4, 1979

[51] Int. Cl.³ .......................... G03B 1/04; G11B 15/32
[52] U.S. Cl. .................................... 242/201; 226/195
[58] Field of Search .............................. 242/197-204, 242/55.19 A, 208-210, 76, 67.1; 226/190-195, 180; 355/41; 352/72 R, 78

[56] References Cited

U.S. PATENT DOCUMENTS

| 3,233,807 | 2/1966 | Wray | 226/180 |
| 3,369,765 | 2/1968 | Jensen | 242/76 |
| 3,387,798 | 6/1968 | Young | 242/67.1 |
| 3,826,489 | 7/1974 | Watkins, Jr. | 242/76 |
| 4,144,991 | 3/1979 | Eddy | 226/195 |

Primary Examiner—Leonard D. Christian
Attorney, Agent, or Firm—Alan B. Samlan

[57] ABSTRACT

A web supply and take-up system in which the web is transported from a supply reel to a take-up reel by means of a capstan and pressure roller. The take-up reel is driven to wind up the transported web. The improvement comprises a roller mounted for restricted rotation and placed between the supply and take-up reels in frictional engagement with the web. The roller supplies a counter force to the take-up reel drive force which assists the capstan and pressure roller in stopping undesired web movement.

7 Claims, 4 Drawing Figures

U.S. Patent      Oct. 21, 1980      4,228,972
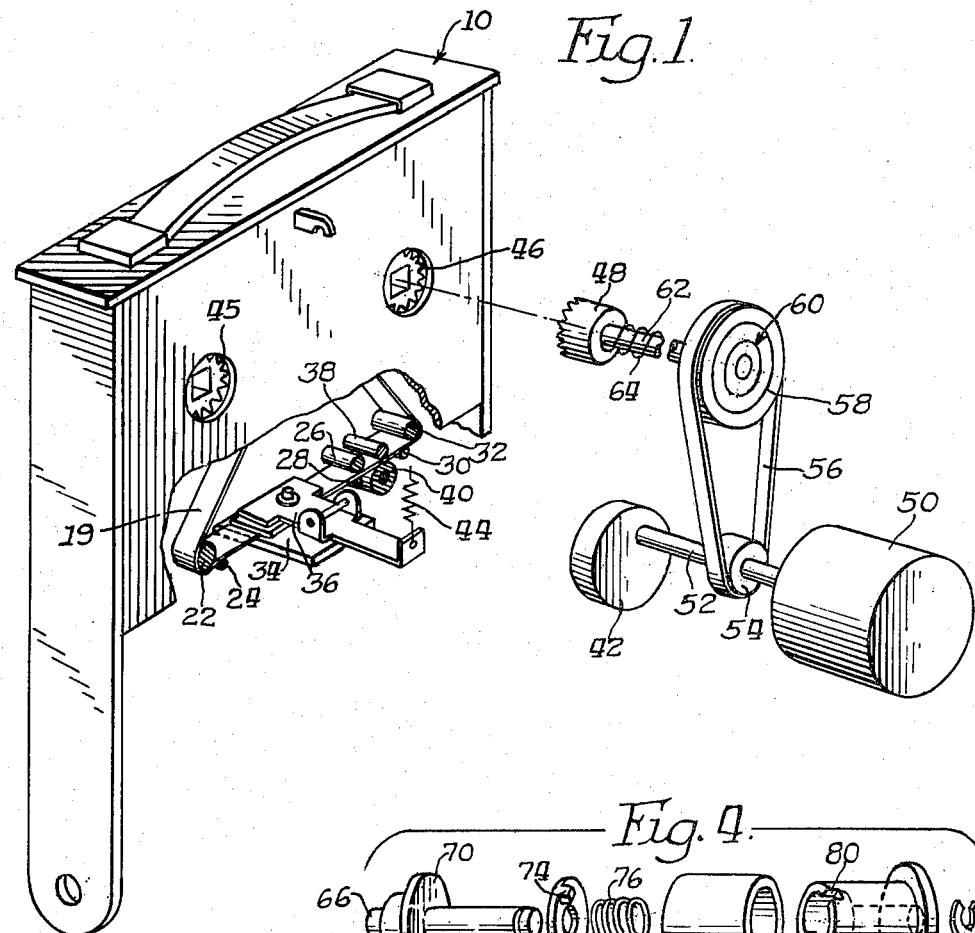
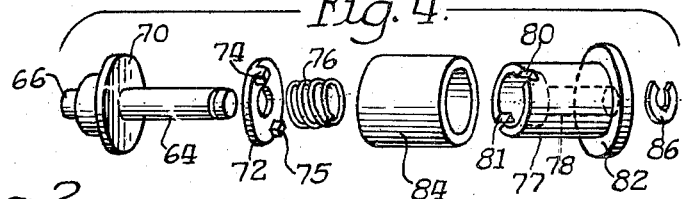
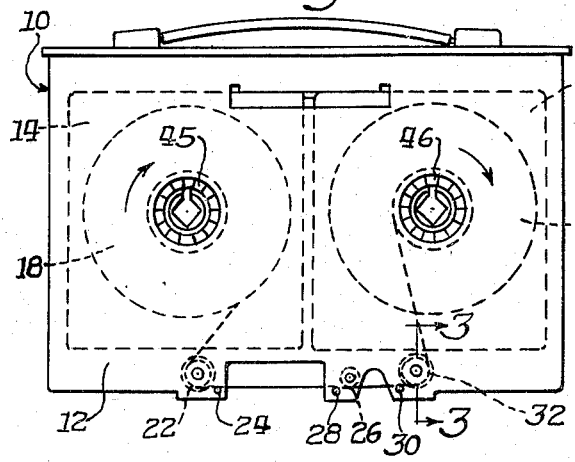
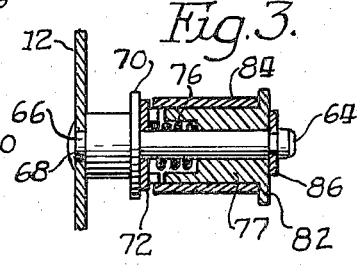

WEB SUPPLY AND TAKE-UP SYSTEM

BACKGROUND OF INVENTION

This invention relates to an improved web supply and takeup system whereby the supply and take-up of the web is more precisely controlled.

An example of an Automatic Microfilm Camera using a web supply and take-up system is illustrated in U.S. Pat. No. 4,148,579 entitled Automatic Microfilm Camera by Donald J. Axelrod and John R. Flint, inventors, and assigned to the Assignee of this application.

As mentioned in the '579 patent the web or film transport mechanism transports film from a supply reel to a take-up reel, both reels being mounted on a cassette. Rollers mounted on the cassette guide the film from one reel to the other. The film is to be moved a precise amount corresponding to photographing one image per frame. A capstan and pressure roller measure out a predetermined length of film for each image photographed. Exposed film is then taken up by the take-up reel. Precisely metering out substantially identical lengths of film for each photographic image placed on the film is important so that the film can later be placed in microfilm jackets with the proper number of images per row in the jacket.

The film take-up system illustrated in the '579 patent is driven through a clutch with a predetermined torque. At times the force on the film is greater than the withholding force of the capstan and pressure roller causing additional lengths of film to be pulled through the capstan and pressure roller than is metered out. This results in a greater distance between images on the microfilm than is desired. After the film is developed it is either left in roll format or cut and inserted into microfilm jackets. If the images are not accurately and uniformly spaced, then the same number of images will not be inserted into each row in the microfilm jacket. Since a great deal of the microfilm insertion is done automatically, improper spacing of the images can result in increased down time, ruined microfilm, and over-all inefficiency.

Thus, it would be advantageous to have a system which would accurately and precisely supply and take-up a predetermined length of web or film upon demand. It would also be beneficial to build such a system easily and inexpensively and be easily adaptable to existing systems.

SUMMARY OF THE INVENTION

The present invention relates to an improved web supply and take-up system for accurately and precisely supplying and taking up a predetermined length of web or film. It is particularly well suited for microfilm cameras wherein a precise predetermined length of microfilm must be transported for each image photographed on the microfilm. In one embodiment a film cassette having microfilm contained in a supply reel was transported over a film transport path comprised of several film positioning rollers and driven by a capstan and pressure roller. The take-up reel was driven through a clutch assembly which maintained a constant torque. The capstan and pressure roller clamped down upon the film and kept the take-up reel from continuously pulling and winding the film up onto the take-up reel.

When the take-up reel is practically empty, which occurs when a new roll of film is inserted for use, the force pulling the film between the pressure roller and capstan is at its greatest. This results in an additional amount of film slipping between the capstan and pressure roller in addition to the predetermined length of film which is metered out by the capstan. Thus, as images are photographed on the film a problem arises. There is more space than programmed between images. This problem becomes less severe as more film is wound on the take-up reel as the force pulling the film is lessened and the capstan and pressure roller can more easily clamp and retain the film.

The solution was to install a restricted rotation roller between the capstan and take-up reel. The roller was designed such that it would not freely rotate and would have a high coefficient of friction between itself and the film. The roller adds a braking or dragging force which acts in a direction opposite the force tending to wind the film on the take-up reel. This braking force aids the capstan and pressure roller in restraining unwanted film movement, thereby significantly reducing the amount of film which slipped through the capstan and pressure roller.

BRIEF DESCRIPTION OF THE DRAWINGS

The features of the invention may become more apparent from a study of the attached drawings in which:

FIG. 1 is a perspective view of the improved web supply and take-up system.

FIG. 2 is a rear view of a cassette plate having supply and take-up reels mounted thereon.

FIG. 3 is a cross sectional view taken along line 3—3 of FIG. 2 of a restricted rotation roller.

FIG. 4 is an exploded view of the restricted rotation roller of FIG. 3.

DESCRIPTION OF THE PREFERRED EMBODIMENT

Turning first to FIG. 1 there is illustrated a web transport system which finds particular applicability in an automatic microfilm camera such as illustrated in U.S. Pat. No. 4,148,579 entitled Automatic Microfilm Camera incorporated herein by reference. A film cassette 10 has a cassette plate 12 which retains a film supply cartridge 14 and film take-up cartridge 16. Inside the film supply cartridge 14 is a supply reel 18; in the take-up cartridge 16 is a take-up reel 20. When a new roll of microfilm is inserted for use, a short length of web or film 19 is pulled from the supply cartridge 14 over a first roller 22 and between the first roller 22 and a first guide post 24. It is then passed between a second roller and guide post 26, 28, between a third guide post 30 and friction roller 32, and then wound on the take-up reel 20 in the take-up cartridge 16.

When the film cassette 10 is loaded into the automatic microfilm camera the film transport mechanism is stopped. An aperture plate 34 and pressure plate and carrier assembly 36 are separated. Also, a capstan 38 and pressure roller 40 are moved away from each other. As the film cassette 10 is placed in the operable position, the film 19 is slipped between the aperture plate 34 and the pressure plate and carrier assembly 36 and between the capstan 38 and pressure roller 40. The position of the aperture plate 34 is fixed and the pressure plate and carrier assembly 36 is controlled by a cam 42 (and associated linkage not illustrated) designed to hold these parts open while the film 19 is moving. Therefore during transport the film will not be scratched. As soon as the cassette and film are in the photograph position, the cam 42 has rotated such that the pressure plate and carrier assembly 36 are moved to the closed position with respect to the fixed aperture plate 34 and the spring 44 pulls the plates closed. The pressure plate and carrier assembly 36 holds the film 19 flat in the film format area. As each document image is photographed the cam 42 rotates to open the pressure plate assembly 36. The capstan 38 then advances the film 19 one frame and the pressure plate assembly 36 is returned to its closed position. This sequence of events occurs after each document is photographed and is controlled by one revolution of the cam 42.

The supply reel 18 has a V-notch coupler 45 which is coupled to a mating V-notch coupler (not illustrated) for determining the amount of film left in the supply cartridge. The take-up reel 20 has an identical V-notch coupler 46 and associated coupler 48, the operation which will be more fully described below.

In order to wind the exposed film which the capstan has pulled from the supply reel 18, the take-up reel 20 must be driven with a certain amount of torque. The torque must be sufficient to overcome the resistance of the take-up reel 20 rubbing against the take-up cartridge 16, the forces between the film 19 and the take-up reel 20 and between the film 19 and the entrance slot of the take-up cartridge 16. These forces acting against the take-up film of the film vary due to manufacturing tolerances. At times the reel 20 may pinch the film 19 or the reel 20 may rub excessively against the sides of the take-up cartridge 16. At other times the film entrance slot in the take-up cartridge 16 may tend to pinch the film 19. So that the film will be guaranteed of being taken up by the take-up reel 20, the torque with which the take-up reel 20 is driven must be sufficient to overcome the worst expected conditions.

To provide the torque necessary to rotate the take-up reel 20 a system such as illustrated in FIG. 1 was used. A motor 50, which can be the same motor which rotates the cam 42, has a shaft 52 extending from it. Mounted on the shaft 52 is a pulley 54 with a belt around it. In turn the belt 56 passes around a driven pulley 58 which has a slip ring clutch 60 at the inner hub of the driven pulley 58. Other clutch systems would operate satisfactorily and would be available to those skilled in the art. A shaft 62 is in turn driven by the driven pulley 58 and the V-notch coupler 48 is mounted at the end of the shaft 62. A spring 64 keeps the V-notch coupler 48 in contact with coupler 46 and allows for manufacturing tolerances between the two couplers. Also, the spring 64 allows for slight movement of the coupler 48 when coupler 46 is pushed into engagement. The slip ring clutch 60 is designed such that the torque which shaft 62 will be driven with its adjustable. However, once the torque is set, the shaft 62 maintains the preset torque. Thus, the take-up reel 20 will be subjected to a continuous take-up torque.

When a new roll of film is inserted into the cassette 10 the take-up reel 20 is substantially empty. As seen in FIG. 2 the radius from the center of the take-up reel 20 to the point where the film 19 is wound on the take-up reel 20 is at its minimum distance. Thus, with a preset torque the force tending to wind the film is at its greatest in this condition. The capstan 38 and pressure roller 40 meter out a predetermined length of film for each image photographed. The film is then pinched between capstan 38 and pressure roller 40 and no further movement is desired. However the torque which the slip clutch 60 was set for was based on the worst expected film take-up conditions. Thus, if the worst conditions are not present, which they are normally not, the force exerted by the shaft 62 and coupler 48 tending to wind the film on the take-up reel 20 causes a small additional length of film to slip between the capstan 38 and pressure roller 40 as there are practical limits to the forces which can be used to hold these two members in contact with each other. This results in additional unwanted spacing between photograhic images on the film 19. As more images are photographed and the radius increases from the center of the take-up reel 20 to the point where the film is taken up on the reel 20, the force tending to pull the film past the capstan 38 decreases. Thus, the problem of unwanted additional spacing between images is no longer present.

Applicant's solution was to supply the friction roller 32 which is more clearly illustrated in FIGS. 3 and 4. A post 64 having an end 66 was inserted into a hole 68 in the cassette plate 12. This could be a friction fit or a rivet type of insert. The post 64 had a collar 70 which supported a bottom flange 72 having two keys 74, 75. A spring 76 was then placed over the post 64. A roller 77 with a top flange 82 received a rubber sleeve 84 which was stretched over the roller 77. The roller 77 had a central passageway 78 to receive the post 64. Keyways 80, 81 received the keys 74, 75 respectively. The assembly was then pressed together such that a retainer ring 86 was placed into a groove 88 on the post of 64. With this assembly the roller 77 and associated rubber sleeve 84 would rotate but the rotation would be restricted due to the clutch type assembly of the friction roller 32. Specifically, as illustrated in FIGS. 3 and 4, it is seen that the collar 70 and bottom flange 72, and top flange 82 and retainer ring 86 are in frictional engagement and act as a clutch when the roller rotates. The torque necessary to rotate the roller 77 could be varied by changing the spring 76. The length of the roller 77 and rubber sleeve 84 was sufficient to receive the width of the film 19. Also, a rubber or urethane sleeve 84 was choosen so that there would be high coefficient of friction between the film 19 and sleeve 84.

In operation, the capstan 38 and pressure roller 40 would feed the film in a direction towards the take-up reel 20. The friction roller 32 added a dragging force which acted counter to the force of the take-up reel torque. When the capstan 38 stopped feeding the film 19, the force from the take-up reel was still present. However, the friction roller 32 added a force in a direction opposite to the take-up force assisting the capstan and pressure roller in stopping the film. Thus, the additional film which tended to slip between the capstan 38 and pressure roller 40 is now lessened to a negligible amount. When the take-up reel is substantially full, the friction roller 32 does not inhibit take-up film in that the force from the take-up reel is still sufficient to wind the film onto the reel.

Thus it is apparent that there has been provided, in accordance with the invention, an improved web supply and take-up system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. In a web supply and take-up system wherein a web is transported by means of a capstan and pressure roller from a supply reel to a take-up reel and wherein the take-up reel is driven to wind up the web transported, the improvement comprising:

a friction roller placed between the supply and take-up reels comprising an outer cylindrical face to receive the web in frictional engagement, a fixed central post having a substantially flat portion affixed near one end, a pressure plate having at least one substantially flat surface in frictional contact with the flat portion of the fixed central post, spring means positioned internal to the outer cylindrical face for continuously urging the pressure plate against the flat portion, whereby the friction roller supplies a force counter to the take-up reel drive force to assist the capstan and pressure roller in stopping undesired web movement.

2. The web supply and take-up system as described in claim 1 wherein the outer cylindrical face is a rubber cover to increase the coefficient of friction between the roller and web.

3. The web supply and take-up system as described in claim 1, or 2 wherein the roller is placed between the take-up reel and the capstan.

4. The web supply and take-up system as described in claim 1 wherein the take-up reel drive force is substantially constant.

5. The web supply and take-up system as described in claim 1 wherein the outer cylindrical face is a urethane cover to increase the coefficient of friction between the roller and web.

6. The web supply and take-up system as described in claim 1 wherein the spring means is a circular spring positioned circumferentially around the fixed central post.

7. The web supply and take-up system of claim 1 and further comprising a retainer mounted at an end of the central post opposite the flat portion, a second pressure plate in frictional contact with the retainer, and the spring means urging the second pressure plate against the retainer.

* * * * *